United States Patent [19]
Kato et al.

[11] Patent Number: 5,663,251
[45] Date of Patent: Sep. 2, 1997

[54] METHOD FOR PRODUCING A FLUORINE-CONTAINING COPOLYMER

[75] Inventors: Kazuo Kato; Atsushi Funaki; Teruo Takakura, all of Yokohama, Japan

[73] Assignee: Asahi Glass Company Ltd., Tokyo, Japan

[21] Appl. No.: 659,364

[22] Filed: Jun. 6, 1996

[30] Foreign Application Priority Data

Jun. 7, 1995 [JP] Japan .................. 7-140894

[51] Int. Cl.$^6$ ................................. C08F 2/00
[52] U.S. Cl. ........................... 526/206; 526/255
[58] Field of Search ............................. 526/206

[56] References Cited

U.S. PATENT DOCUMENTS 4,262,101  4/1981  Hartwimmer et al. ............ 526/206

FOREIGN PATENT DOCUMENTS

| | | |
|---|---|---|
| 0219065 | 4/1987 | European Pat. Off. ......... 526/206 |
| 0 247 379 | 12/1987 | European Pat. Off. . |
| 0 626 395 | 11/1994 | European Pat. Off. . |
| 2019209 | 10/1970 | Germany ....................... 526/206 |
| 0469261 | 3/1971 | Japan ............................. 526/206 |
| 49-11746 | 3/1974 | Japan ............................. 526/206 |
| 49-28911 | 7/1974 | Japan ............................. 526/206 |
| 0781532 | 8/1957 | United Kingdom ........... 526/206 |
| 0837992 | 12/1960 | United Kingdom ........... 526/206 |
| 0864130 | 3/1961 | United Kingdom ........... 526/206 |
| 1067068 | 5/1967 | United Kingdom ........... 526/206 |
| WO96/22315 | 7/1996 | WIPO . |

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

A method for producing a fluorine-containing copolymer, which comprises suspension-polymerizing at least one fluoroolefin, or at least one fluoroolefin and at least one monomer copolymerizable with the fluoroolefin, in a polymerization medium comprising at least one solvent selected from the group consisting of a perfluorocarbon, a hydrofluorocarbon and a hetero atom-containing perfluorocarbon, water and a fluorine-containing surfactant.

10 Claims, No Drawings

METHOD FOR PRODUCING A FLUORINE-CONTAINING COPOLYMER

The present invention relates to a method for producing a fluorine-containing copolymer by novel suspension polymerization. More particularly, the present invention relates to a method for producing a fluorine-containing copolymer having excellent physical properties and a uniform composition of polymer units by a suspension polymerization method employing a solvent which scarcely brings about environmental destruction, such as a perfluorocarbon, a hydrofluorocarbon or a hetero atom-containing perfluorocarbon, without forming a non-uniform product even at a high polymer concentration.

In recent years, fluorine-containing copolymers are employed in various fields by virtue of their excellent properties, since they are polymer materials excellent in e.g. heat resistance, solvent resistance and chemical resistance. A solution polymerization method, a suspension polymerization method or an emulsion polymerization method is known as a method for producing such fluorine-containing copolymers. As a solvent for the solution polymerization method or the suspension polymerization method, an inert solvent such as a chlorofluorocarbon is usually employed, since a copolymer having a high molecular weight can thereby be obtained, or a high polymerization rate can thereby be obtained.

Whereas, in recent years, destruction of the ozone layer has been internationally taken up as an environmental destruction problem of a global scale, and a chlorofluorocarbon has been pointed out as a substance causing such destruction. Accordingly, use of such a substance is expected to be completely banned world-widely. Accordingly, it is now required to stop using chlorofluorocarbons which have been used for the production of fluorine-containing polymers. As a substitute solvent for such a chlorofluorocarbon, a perfluorocarbon, a hydrofluorocarbon or a hetero atom-containing perfluorocarbon having a smaller ozone destruction coefficient, has been proposed and is being practically used.

As a suspension polymerization method, it is common to employ a method wherein a solvent is dispersed in water to carry out the polymerization. By such a method, when a chlorofluorocarbon such as trichlorotrifluoroethane (hereinafter referred to as R113) is used as a solvent, a uniform fluorine-containing copolymer can be obtained in a region where the concentration of the resulting polymer is high. However, in a suspension polymerization method wherein a solvent having a less possibility of environmental destruction, such as a perfluorocarbon, a hydrofluorocarbon or a hereto atom-containing perfluorocarbon, is employed, a non-uniform fluorine-containing copolymer will form in a high polymer concentration region.

This may be attributable to the fact that a perfluorocarbon, a hydrofluorocarbon or a hetero atom-containing perfluorocarbon has a low affinity to the resulting fluorine-containing copolymer as compared with the chlorofluorocarbon, and accordingly, in the polymerization using such a perfluorocarbon, a hydrofluorocarbon or a hereto atom-containing perfluorocarbon as a solvent, dispersion of the resulting fluorine-containing copolymer tends to be insufficient in the high polymer concentration region even with stirring, whereby the distribution of the monomer composition in the polymerization system tends to be non-uniform, and consequently a non-uniform fluorine-containing copolymer is likely to form.

Under these circumstances, it is an object of the present invention to provide a method for producing a fluorine-containing copolymer having excellent physical properties by a suspension polymerization method employing a solvent having a less possibility of environmental destruction, without forming a non-uniform polymer even in a high polymer concentration region.

The present inventors have conducted extensive researches to accomplish the above object and as a result, have found it possible to accomplish the object by incorporating a fluorine-containing surfactant as a dispersion stabilizer to the polymerization system.

Thus, the present invention provides a method for producing a fluorine-containing copolymer, which comprises suspension-polymerizing at least one fluoroolefin, or at least one fluoroolefin and at least one monomer copolymerizable with the fluoroolefin, in a polymerization medium comprising at least one solvent selected from the group consisting of a perfluorocarbon, a hydrofluorocarbon and a hetero atom-containing perfluorocarbon, water and a fluorine-containing surfactant.

Now, the present invention will be described in detail with reference to the preferred embodiments.

In the present invention, the fluorine-containing copolymer is the one having fluoroolefin polymer units as the main constituting units. The fluoroolefin has at least one fluorine atom in its molecule, and in view of the polymerizability and the nature of the resulting fluorine-containing copolymer, a fluoroolefin having 2 or 3 carbon atoms is preferred. Specific examples of such a fluoroolefin include $CF_2=CF_2$, $CF_2=CFCl$, $CF_2=CH_2$ and $CF_2=CFCF_3$. These fluoroolefins may be used alone or in combination as a mixture of two or more of them.

Further, at least one monomer copolymerizable with a fluoroolefin may be copolymerized with the fluoroolefin. As the monomer copolymerizable with the fluoroolefin having 2 or 3 carbon atoms, a combination of monomers including, for example, a non-fluorine type olefin such as ethylene, propylene or isobutylene, a fluorine type olefin of the chemical formula $CH_2=C(CF_3)_2$, $CH_2=C(CF_3)CH_3$, $CH_2=CX(CF_2)_nH$, wherein X is H or F, and n is an integer of from 2 to 10, a perfluoro(alkylvinyl ether) and a (perfluoroalkyl)ethylene, may be employed.

Particularly preferred is a combination of ethylene and tetrafluoroethylene to produce an ethylene/tetrafluoroethylene copolymer, or a combination of a perfluoro(alkylvinyl ether) and tetrafluoroethylene to produce a perfluoro(alkylvinyl ether)/tetrafluoroethylene copolymer.

In the present invention, it is important to use a fluorine-containing surfactant in the polymerization. The fluorine-containing surfactant may be a cationic, anionic, nonionic or amphoteric. However, the one having a low chain transfer property is preferred. Particularly preferred is the one represented by the formula $C_nF_{2n+1}CO_2X$ or $C_nF_{2n+1}SO_3X$, wherein n is an integer of from 4 to 12, and X is $NH_4$ or an alkali metal.

The fluorine-containing surfactant is used preferably within a range of from 0.01 to 10 wt %, to water. If the amount is too much, there will be problems such as poor physical properties and discoloration of the polymer at the time of molding. On the other hand, if the amount is too small, no adequate effects can be obtained. From the viewpoint of the costs, the amount is more preferably from 0.01 to 1.0 wt %.

The solvent to be used in the present invention, is a single use or a combination of solvents which scarcely bring about a problem of environmental destruction, such as a perfluorocarbon, a hydrofluorocarbon, and a perfluorocarbon containing a hetero atom such as oxygen, nitrogen or sulfur. Such a solvent is preferably a $C_{4-10}$ perfluorocarbon, a $C_{3-10}$ hydrofluorocarbon wherein the number of hydrogen atoms is at least 1 and not larger than the number of fluorine atoms, or a $C_{4-10}$ perfluorocarbon containing from 1 to 4 hetero atoms.

Specific examples include a perfluorocarbon such as perfluorohexane, perfluorocyclohexane, perfluorocyclobutane, perfluorobenzene or m-perfluoroxylene; a hydrofluorocarbon such as (perfluorobutyl)methane, (perfluorobutyl)ethane, (perfluoropentyl)difluoromethane, 2-trifluoromethyl-1,1,1,2,3,4,5,5,5-nonafluoropentane or 1,1,1,2,3,4,4,5,5,5-decafluoropentane; and a perfluorocarbon having from 1 to 4 hetero atoms such as bis(perfluoropropyl)ether, perfluoro(butylmethyl)ether, perfluoro(2-butyltetrahydrofuran), bis(perfluoropropyl)ketone, tris(perfluorobutyl)amine, bis(perfluoropropyl)sulfide, bis(perfluoro-n-butyl)sulfide or perfluoro-1,4-dithian.

The solvent and the water are preferably used in a volume ratio of solvent/water of from 30/70 to 70/30.

In the present invention, a radical initiator to be used, may be suitable selected from those which have been commonly used. The radical initiator may, for example, be di(chlorofluoroacyl) peroxide, di(perfluoroacyl) peroxide, di(ω-hydroperfluoroacyl) peroxide, t-butyl peroxyisobutylate or diisopropyl peroxydicarbonate. The amount of the polymerization initiator is determined depending upon the type of the polymerization initiator and the reaction conditions for polymerization. It is usually from 0.005 to 5 wt %, preferably from 0.05 to 0.5 wt %, based on the total amount of the monomers.

For the polymerization reaction in the present invention, a wide range of reaction conditions can be employed without any particular restriction. For example, with respect to the polymerization reaction temperature, the optimum temperature is determined depending upon e.g. the type of the polymerization initiator. However, it is usually within a range of from 0° to 100° C., preferably from 30° to 90° C. The reaction pressure may also be optionally set, but is usually within a range of from 2 to 100 kg/cm$^2$, preferably from 5 to 20 kg/cm$^2$. In the method of the present invention, polymerization can advantageously be carried out without requiring an excessively high reaction pressure. However, a high pressure may be employed. Otherwise, polymerization can be conducted under a reduced pressure condition. Further, the method of the present invention may be carried out appropriately by a batch system or a continuous system.

In the production of a fluorine-containing copolymer in the present invention, it is common to add a molecular weight controlling agent having a chain transfer property for the purpose of controlling the molecular weight of the fluorine-containing copolymer. Such a molecular weight controlling agent is required to be soluble in the solvent. However, a compound having a large chain transfer constant may be slightly soluble in the solvent, since the control of the molecular weight is thereby easy. Further, it is desired to have a low ozone destruction coefficient.

A molecular weight controlling agent which satisfies these requirements, may, for example, be a hydrocarbon such as methane or ethane, a hydrochlorofluorocarbon such as 1,3-dichloro-1,1,2,2,3-pentafluoropropane (hereinafter referred to as HCFC225cb) or 1,1-dichloro-2,2,3,3,3-pentafluoropropane, a ketone such as acetone, or an alcohol such as methanol or ethanol.

Now, the present invention will be described in further detail with reference to Examples. However, it should be understood that the present invention is by no means restricted by such specific Examples.

EXAMPLE 1

A stainless steel reactor having an internal capacity of 1.2 l and equipped with a stirrer, was deaerated, and 540 g of perfluorohexane, 119 g of HCFC225cb, 403 g of deionized water, 0.4 g of surfactant $C_7F_{15}CO_2NH_4$, 84 g of tetrafluoroethylene and 6 g of ethylene were charged. While maintaining the temperature at 65° C., 6.8 ml of a 50% HCFC225cb solution of t-butyl peroxyisobutylate was charged as an initiator to initiate the reaction. During the reaction, a gas mixture of tetrafluoroethylene/ethylene (composition: 53/47 in molar ratio) was introduced into the system, and the reaction pressure was maintained at 16.1 kg/cm$^2$. 6.5 Hours later, 142 g of a copolymer was obtained in a suspended state.

The copolymer had a polymer unit composition (molar ratio) of tetrafluoroethylene/ethylene=53/47, a melting point of 273° C. and a decomposition initiating temperature of 342° C., and a molded product obtained by compression molding at a molding temperature of 300° C. was uniform and had a high level of transparency. Further, the tensile strength of the molded product was 485 kg/cm$^2$, and the tensile elongation was 460%.

EXAMPLE 2

The reaction was carried out in the same manner as in Example 1 except that 540 g of (perfluoropentyl)difluoromethane was charged instead of the perfluorohexane, and 7 hours later, 145 g of a copolymer was obtained in a suspended state.

The copolymer had a polymer unit composition (molar ratio) of tetrafluoroethylene/ethylene=53/47, a melting point of 275° C. and a decomposition initiating temperature of 338° C., and a molded product obtained by compression molding at a molding temperature of 300° C. was uniform and had a high level of transparency. Further, the tensile strength of the molded product was 490 kg/cm$^2$, and the tensile elongation was 465%.

EXAMPLE 3

The reaction was carried out in the same manner as in Example 1 except that 540 g of (perfluorobutyl)ethane was charged instead of the perfluorohexane, and 6 hours later, 125 g of a copolymer was obtained in a suspended state.

The copolymer had a polymer unit composition (molar ratio) of tetrafluoroethylene/ethylene=53/47, a melting point of 276° C. and a decomposition initiating temperature of 340° C., and a molded product obtained by compression molding at a molding temperature of 300° C. was uniform and had a high level of transparency. Further, the tensile strength of the molded product was 480 kg/cm$^2$, and the tensile elongation was 490%.

EXAMPLE 4

The reaction was carried out in the same manner as in Example 1 except that 550 g of bis(perfluoropropyl)ether was charged instead of the perfluorohexane, and 6.5 hours later, 140 g of a copolymer was obtained in a suspended state.

The copolymer had a polymer unit composition (molar ratio) of tetrafluoroethylene/ethylene=53/47, a melting point of 272° C. and a decomposition initiating temperature of 335° C., and a molded product obtained by compression molding at a molding temperature of 300° C. was uniform and had a high level of transparency. Further, the tensile strength of the molded product was 475 kg/cm$^2$, and the tensile elongation was 470%.

EXAMPLE 5

A stainless steel reactor having an internal capacity of 1.2 l and equipped with a stirrer, was deaerated, and 670 g of perfluorohexane, 37 g of methanol, 378 g of deionized water, 0.4 g of surfactant $C_7F_{15}CO_2NH_4$, 84 g of tetrafluoroethylene and 6 g of ethylene were charged. While maintaining the temperature at 65° C., 6.8 ml of a 50% HCFC225cb solution of t-butyl peroxyisobutylate was charged as an initiator to initiate the reaction. During the reaction, a gas mixture of tetrafluoroethylene/ethylene (composition: 53/47 in molar ratio) was introduced into the system, and the reaction pressure was maintained at 16.1 kg/cm$^2$. 6.7 Hours later, 145 g of a copolymer was obtained in a suspended state.

The copolymer had a polymer unit composition (molar ratio) of tetrafluoroethylene/ethylene=53/47, a melting point of 277° C. and a decomposition initiating temperature of 337° C., and a molded product obtained by compression molding at a molding temperature of 300° C., was uniform and had a high level of transparency. Further, the tensile strength of the molded product was 485 kg/cm$^2$ and the tensile elongation was 470%.

EXAMPLE 6

A stainless steel reactor having an internal capacity of 1.2 l and equipped with a stirrer, was deaerated, and 314 g of (perfluoropentyl)difluoromethane, 35 g of perfluoro (propylvinyl ether), 19 g of methanol, 470 g of deionized water, 0.5 g of surfactant $C_7F_{15}CO_2NH_4$ and 80 g of tetrafluoroethylene were charged. While maintaining the temperature at 50° C., a 1% HCFC225cb solution of di(perfluorobutyryl) peroxide was charged as a catalyst to initiate the reaction. During the reaction, tetrafluoroethylene was introduced into the system, and the reaction pressure was maintained at 13.5 kg/cm$^2$. The catalyst was intermittently charged so that the polymerization rate was substantially constant, in a total amount of 7 ml. 4.5 Hours later, 148 g of a white copolymer was obtained in a suspended state.

The copolymer had a polymer unit composition (molar ratio) of tetrafluoroethylene/perfluoro(propylvinyl ether)= 97/3, a melting point of 308° C. and a decomposition initiating temperature of 450° C., and a molded product obtained by compression molding at a molding temperature of 340° C., was uniform and had a high level of transparency. The tensile strength of the molded product was 415 kg/cm$^2$, and the tensile elongation was 370%.

COMPARATIVE EXAMPLE 1

The reaction was carried out in the same manner as in Example 1 except that surfactant $C_7F_{15}CO_2NH_4$ was not used. 6.5 Hours later, 141 g of a copolymer was obtained in a suspended state. The copolymer had a melting point of 272° C. and a decomposition initiating temperature of 339° C., and a molded product obtained by compression molding at a molding temperature of 300° C., was white and had low transparency, and non-uniformity in the polymer unit composition was observed. The molded product was so brittle that the tensile strength or the tensile elongation could not be measured.

COMPARATIVE EXAMPLE 2

The reaction was carried out in the same manner as in Example 5 except that surfactant $C_7F_{15}CO_2NH_4$ was not used. 4.6 Hours later, 142 g of a copolymer was obtained in a suspended state. The copolymer had a melting point of 305° C. and a decomposition initiating temperature of 447° C., and a molded product obtained by compression molding at a molding temperature of 340° C., was white and had low transparency, and non-uniformity in the polymer unit composition was observed. The molded product was so brittle that the tensile strength or the tensile elongation could not be measured.

According to the method of the present invention, a fluorine-containing copolymer having excellent physical properties and a uniform polymer unit composition even in a high polymer concentration region, can be obtained by a suspension polymerization method employing a solvent which scarcely brings about a problem of environmental destruction.

We claim:

1. A method for producing a fluorine-containing polymer, which comprises suspension-polymerizing at least one fluoroolefin, or at least one fluoroolefin and at least one monomer copolymerizable with the fluoroolefin, in a polymerization medium comprising at least one solvent selected from the group consisting of a perfluorocarbon, a hydrofluorocarbon and a hetero atom-containing perfluorocarbon, water and a fluorine-containing surfactant.

2. The method according to claim 1, wherein the fluorine-containing surfactant is in an amount of from 0.01 to 10 wt % to the water.

3. The method according to claim 1, wherein the fluorine-containing surfactant is a compound of the formula $C_nF_{2n+1}CO_2X$ or $C_nF_{2n+1}SO_3X$, wherein n is an integer of from 4 to 12, and X is $NH_4$ or an alkali metal.

4. The method according to claim 1, wherein the monomer is a combination of ethylene and tetrafluoroethylene, or a combination of a perfluoro(alkylvinyl ether) and tetrafluoroethylene.

5. The method according to claim 1, wherein the perfluorocarbon is a $C_{4-10}$ perfluorocarbon.

6. The method according to claim 1, wherein the hydrofluorocarbon is a $C_{3-10}$ hydrofluorocarbon wherein the number of hydrogen atoms is at least 1 and not larger than the number of fluorine atoms.

7. The method according to claim 1, wherein the hetero atom-containing perfluorocarbon is a perfluorocarbon containing oxygen, nitrogen or sulfur.

8. The method according to claim 1, wherein the perfluorocarbon is perfluorohexane, perfluorocyclohexane, perfluorocyclobutane, perfluorobenzene or m-perfluoroxylene.

9. The method according to claim 1, wherein the hydrofluorocarbon is (perfluorobutyl)methane, (perfluorobutyl) ethane, (perfluoropentyl)difluoromethane, 2-trifluoromethyl-1,1,1,2,3,4,5,5,5-nonafluoropentane or 1,1,1,2,3,4,4,5,5,5-decafluoropentane.

10. The method according to claim 1, wherein the hetero atom-containing perfluorocarbon is bis(perfluoropropyl) ether, perfluoro(butylmethylether), perfluoro(2-butyltetrahydrofuran), bis(perfluoropropyl)ketone, tris (perfluorobutyl)amine, bis(perfluoropropyl)sulfide, bis (perfluoro-n-butyl)sulfide or perfluoro-1,4-dithian.

* * * * *